US006491555B2

(12) United States Patent
Kitsu et al.

(10) Patent No.: US 6,491,555 B2
(45) Date of Patent: Dec. 10, 2002

(54) THROTTLE GRIP POSITION MAINTAINING DEVICE IN OUTBOARD ENGINE SYSTEM

(75) Inventors: Kunihiro Kitsu; Kouichi Oka; Hideki Nemoto, all of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/933,129

(22) Filed: Aug. 21, 2001

(65) Prior Publication Data

US 2002/0028616 A1 Mar. 7, 2002

(30) Foreign Application Priority Data

Aug. 25, 2000 (JP) ....................................... 2000-260891

(51) Int. Cl.[7] ................................................ B60K 41/00
(52) U.S. Cl. ............................................ 440/87; 74/488
(58) Field of Search ............................. 440/53, 63, 87; 74/488, 489

(56) References Cited

U.S. PATENT DOCUMENTS

| | | | | | |
|---|---|---|---|---|---|
| 2,776,579 | A | * | 1/1957 | Nichel, Jr. | 440/87 |
| 3,782,219 | A | * | 1/1974 | Beck et al. | 74/531 |
| 4,137,793 | A | * | 2/1979 | Sowell | 74/488 |
| 4,287,785 | A | * | 9/1981 | Hunt | 74/488 |
| 4,337,053 | A | * | 6/1982 | Stevens | 440/87 |
| 4,650,429 | A | * | 3/1987 | Boda | 440/87 |
| 5,340,342 | A | * | 8/1994 | Boda et al. | 440/87 |
| 5,378,178 | A | * | 1/1995 | Haman | 440/53 |
| 5,797,777 | A | * | 8/1998 | Tsunekawa et al. | 440/87 |
| 5,893,295 | A | * | 4/1999 | Bronnert | 74/488 |

FOREIGN PATENT DOCUMENTS

| | | |
|---|---|---|
| JP | 6-144379 | 5/1994 |

* cited by examiner

*Primary Examiner*—S. Joseph Morano
*Assistant Examiner*—Andrew Wright
(74) *Attorney, Agent, or Firm*—Arent Fox Kintner Plotkin & Kahn, PLLC

(57) ABSTRACT

In an outboard engine system, a throttle grip position maintaining device includes a retained portion integrally formed on a throttle grip, a friction member axially superposed on the retained portion, a support member mounted to a steering bar handle to abut against an inner end face of the retained portion, a regulating member threadedly fitted over the support member and having an urging portion abutting against an outer end face of the friction member, and an anti-loosening means provided between the support member and the regulating member for inhibiting the disorderly movement of the regulating member. With such arrangement, even when a retaining force on the throttle grip is regulated, a thrust load is not applied to the throttle grip, and the retaining force can be maintained stably after the regulation.

4 Claims, 6 Drawing Sheets

THROTTLE GRIP POSITION MAINTAINING DEVICE IN OUTBOARD ENGINE SYSTEM

BACKGROUND OF THE INVENTION

1. Field of the Invention

The present invention relates to an improvement in a throttle grip position maintaining device in an outboard engine system, which is mounted between a bar handle for steering the outboard engine system and a throttle grip rotatably but axially non-movably fitted over the bar handle for controlling the opening degree of a throttle valve of an engine, thereby providing a frictional resistance to the throttle grip to retain the throttle grip at any opening degree of the throttle valve.

2. Description of the Related Art

In such a throttle grip position maintaining device in an outboard engine system, if the frictional resistance provided to the throttle grip is too large, an operating load on the throttle grip is also too large, thereby deteriorating the lightness of the throttle control. On the other hand, if the frictional resistance is too small, a retaining force applied to the throttle grip is also too small and for this reason, the throttle grip is liable to be moved from the position corresponding to a desired opening degree of the throttle valve. Therefore, a throttle grip opening degree maintaining device has been proposed, which is designed so that the frictional resistance is made variable to enable the regulation of the retaining force for a throttle grip, as disclosed in Japanese Patent Application Laid-open No.6-144379.

In the device disclosed in the above Patent, a ring nut is threadedly fitted over the throttle grip, and a friction member is interposed between the ring nut and a step of a bar handle opposed. to an end face of the ring nut, whereby the retaining force for the throttle grip is regulated by regulating the amount of tightening of the ring nut relative to the friction member.

In such throttle grip position maintaining device, however, when the ring nut is, for example, tightened to press the friction member, a thrust load directed to an outer end of the bar handle is applied to the throttle grip due to a reaction of the pressure. When the throttle grip is displaced axially by the thrust load, a variation in opening degree of a throttle valve of an engine is undesirably generated.

SUMMARY OF THE INVENTION

The present invention has been achieved with the above circumstances in view, and it is an object of the present invention to provide a throttle grip position maintaining device of the above-described type in an outboard engine system, wherein even when the retaining force for the throttle grip is regulated, the thrust load is not applied to the throttle grip and moreover, the retaining force can be maintained stably after the regulation.

To achieve the above object, according to a first aspect and feature of the present invention, there is provided a throttle grip position maintaining device in an outboard engine system, which is mounted between a bar handle for steering the outboard engine system and a throttle grip rotatably but axially non-movably fitted over the bar handle for controlling the opening degree of a throttle valve of an engine, thereby providing a frictional resistance to the throttle grip to retain the throttle grip at a position corresponding to any opening degree of the throttle valve. The throttle grip position maintaining device comprises a retained portion which is integrally formed on the throttle grip, a friction member axially superposed on the retained portion, a support member disposed on axially one side of the retained portion and the friction member and axially slidably but non-rotatably mounted to the bar handle, a regulating member threadedly fitted over the support member and having an urging portion disposed on the axially other side of the retained portion and the friction member, and an anti-loosening means provided between the support member and the regulating member for inhibiting the disorderly movement of the regulating member, the friction member being non-rotatably connected relative to one of the retained portion and the support member, but being rotatably connected relative to the other of the retained portion and the support member.

The retained portion and the urging portion correspond to an outward-facing flange 31 and an inward-facing flange 34 respectively in an embodiment of the present invention, which will be described hereinafter.

With the first feature, when the regulating member is tightened relative to the support member, both the support member and the regulating member are displaced axially, to axially clamp the friction member and the retained portion of the throttle grip, thereby providing a desired frictional resistance to the retained portion between the support member and the regulating member. Thus, the throttle grip can be retained at a position corresponding to any opening degree of the throttle valve, while avoiding that a thrust load is applied to the throttle grip.

Moreover, the disorderly movement of the regulating member is inhibited by the anti-loosening means and hence, the regulated retaining force for the throttle grip can be maintained stably, to contribute to an enhancement in steerability of the outboard engine system.

According to a second aspect and feature of the present invention, in addition to the first feature, the anti-loosing means comprises a click stop mechanism designed to provide a sense of moderation to a user, whenever the regulating member is rotated through a given angle.

With the second feature, it is possible for the user to accurately sense an angle of rotation of the regulating means, i.e., the retaining force for the throttle grip.

According to a third aspect and feature of the present invention, in addition to the second feature, the click stop mechanism comprises a plurality of first protrusions projectingly provided on an outer peripheral surface of the support member and arranged at circumferentially equal distances, and a plurality of second protrusions projectingly provided on an inner peripheral surface of the regulating member surrounding the plurality of the first protrusions and arranged at circumferentially equal distances, whereby some of the second protrusions are elastically brought into or out of engagement with some of the first protrusions, whenever the regulating member is rotated through a given angle.

With the third feature, the click stop mechanism comprises the plurality of first protrusions and the plurality of second projections and hence, is extremely simple in construction and can be provided at a low cost.

According to a fourth aspect and feature of the present invention, in addition to the third feature, the numbers of the first and second protrusions are different from each other, and the circumferential widths of the first and second protrusions are also different from each other, whereby some of the first protrusions and some of the second protrusions are in elastic engagement with each other in any rotated position of the regulating member.

With the fourth feature, it is possible to easily set a given angle of the regulating member, thereby providing a sense of moderation to a user.

The above and other objects, features and advantages of the invention will become apparent from the following description of the preferred embodiment taken in conjunction with the accompanying drawings.

DESCRIPTION OF THE PREFERRED EMBODIMENT

The present invention will now be described by way of an embodiment with reference to the accompanying drawings.

Figure 1:
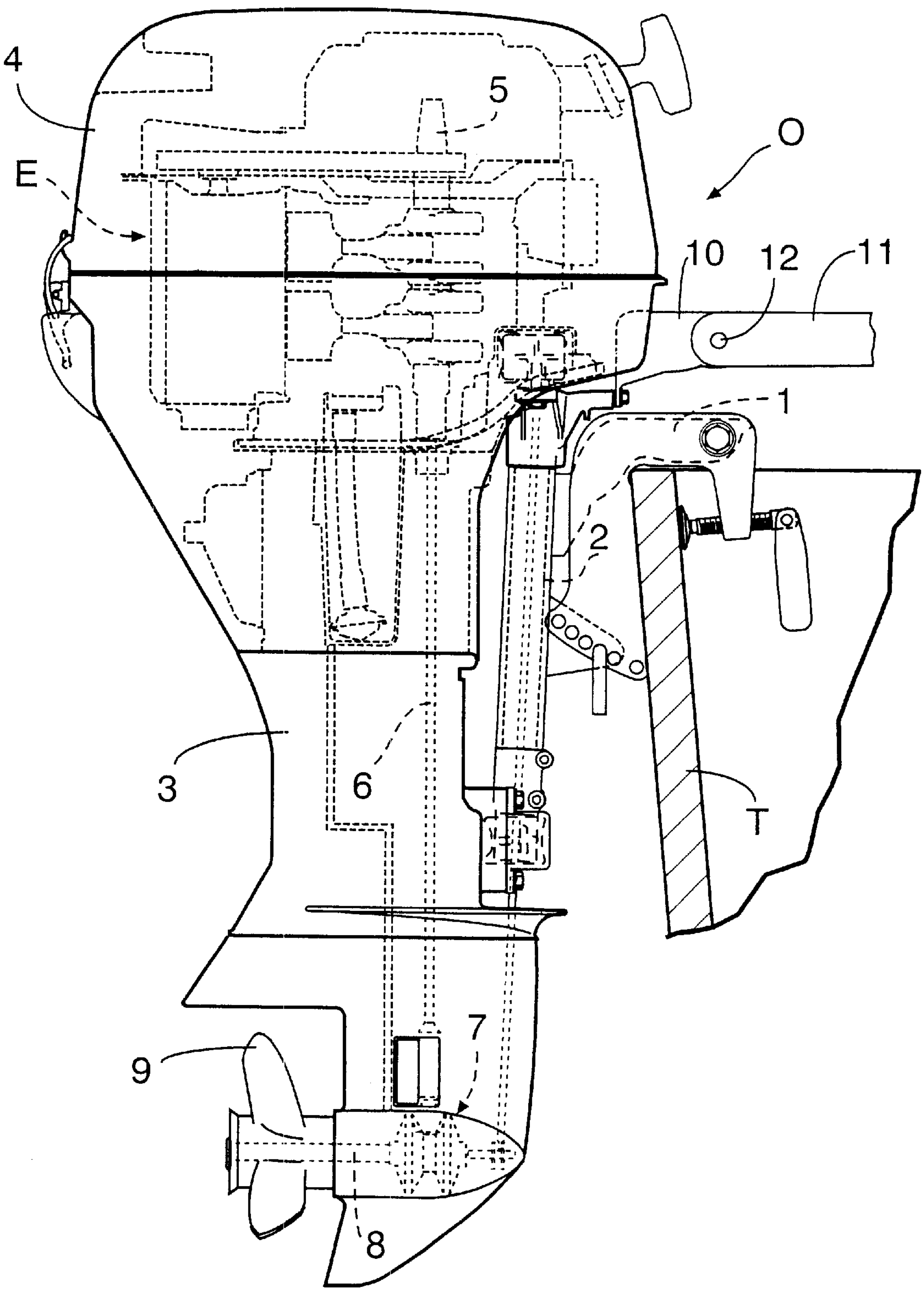
FIG. 1 is a side view of an outboard engine system including a throttle grip position maintaining device according to the present invention.

Referring first to FIG. 1, an outboard engine system O includes a stern bracket 1 clamped on a transom T of a hull, and a casing 3 connected to the stern bracket 1 through a swivel shaft 2 for swinging movement in a lateral direction of the hull to extend vertically. An engine E is mounted at an upper portion of the casing 3, and an engine cover 4 is coupled to the casing 3 to cover the engine E. A power output from a crankshaft 5 of the engine E is transmitted through a drive shaft 6 disposed within the casing 3 and a bevel gear transmitting device 7 capable of switching the forward and backward movements of a boat from one to another to a propeller shaft 8 supported at a lower portion of the casing 3, to thereby drive a propeller 9 mounted at a rear end of the propeller shaft 8.

A handle holder 10 is secured to an outer wall of a rear portion of the engine E, and a steering bar handle 11 is connected to a rear end of the handle holder 10 through a horizontal pivot 12. Therefore, the bar handle 11 is capable of being turned between a service position in which it extends substantially horizontally toward the hull, and a retracted position in which it rises upward. A throttle grip 15 is mounted at a rear end of the bar handle 11 for controlling the opening and closing of a throttle valve (not shown) for regulating the amount of air drawn in the engine E.

Figure 2:
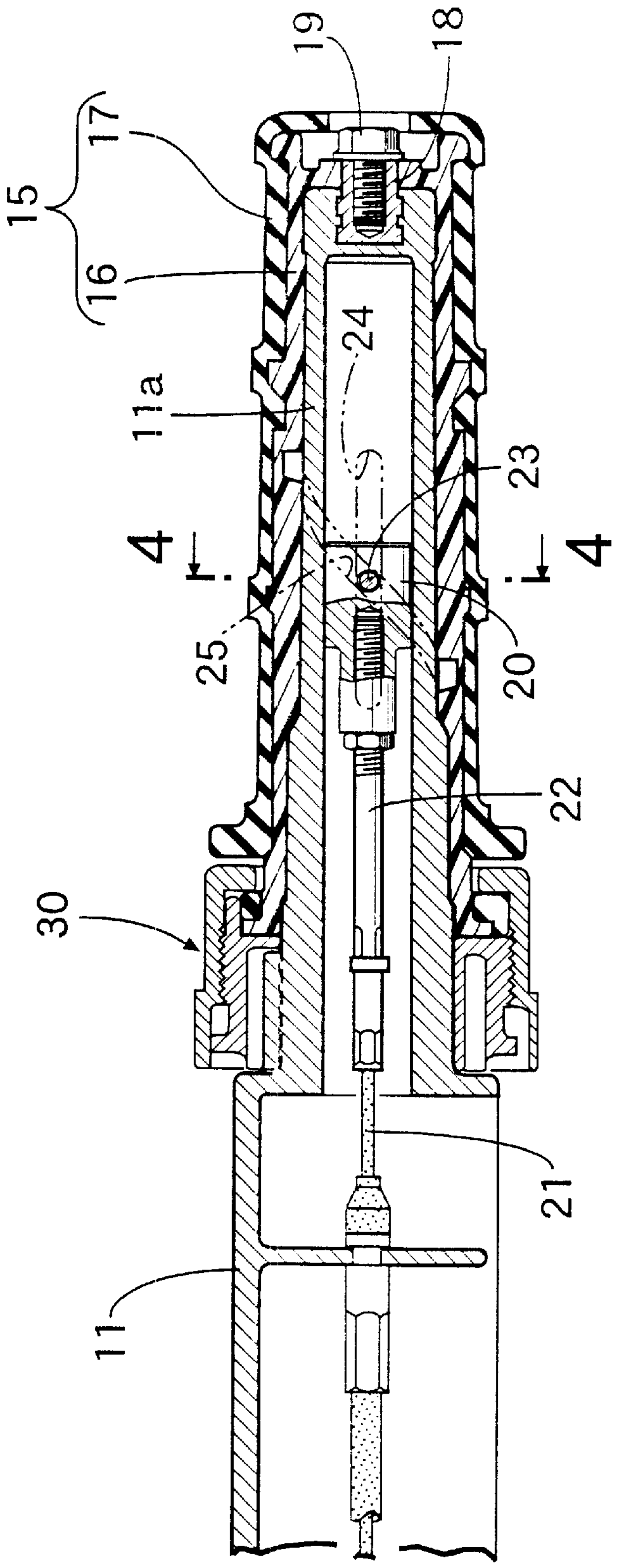
FIG. 2 is an enlarged vertical sectional view of a steering bar handle and other components.
Figure 3:
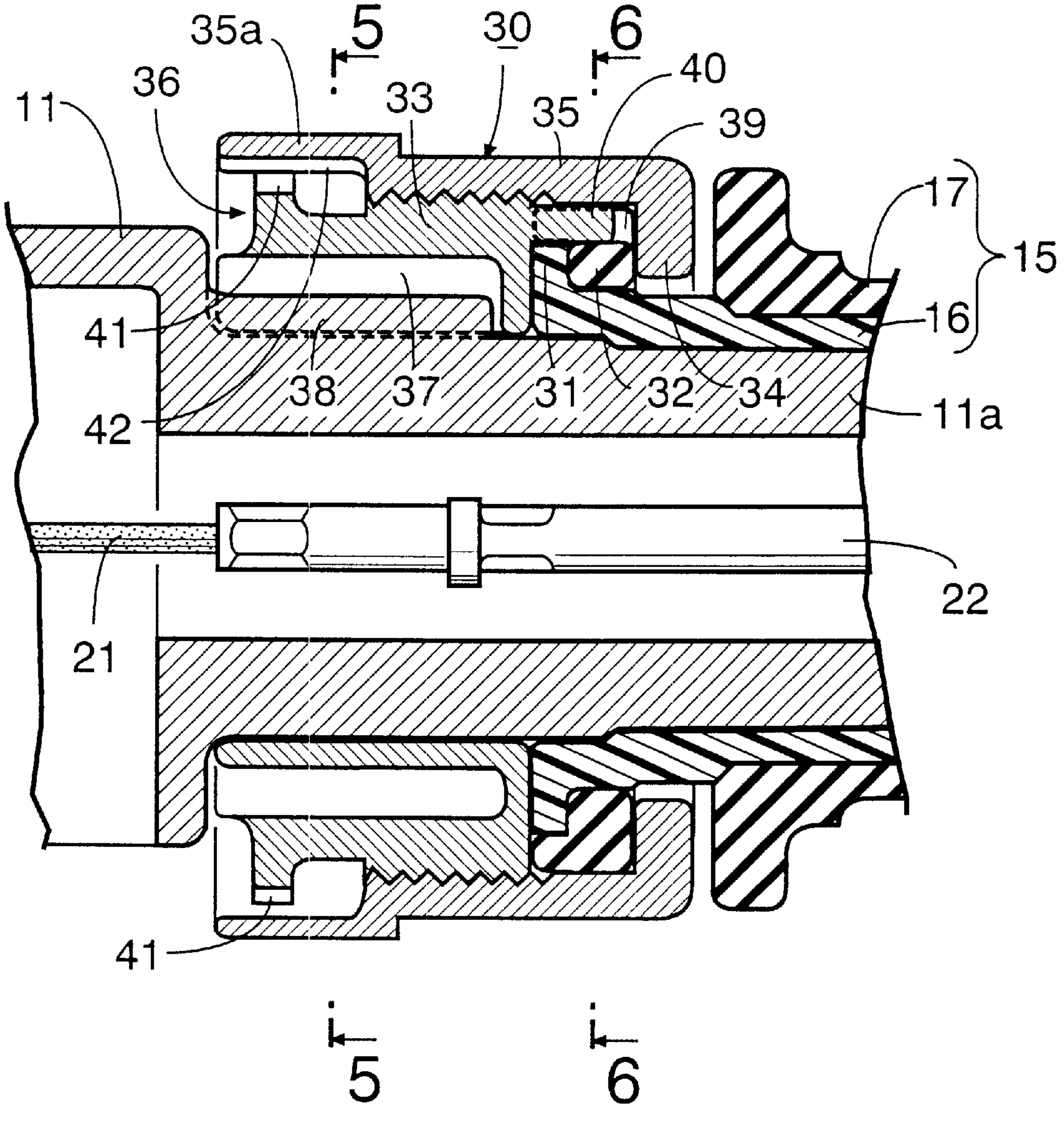
FIG. 3 is an enlarged view of the throttle grip position maintaining device shown in FIG. 2.
Figure 4:
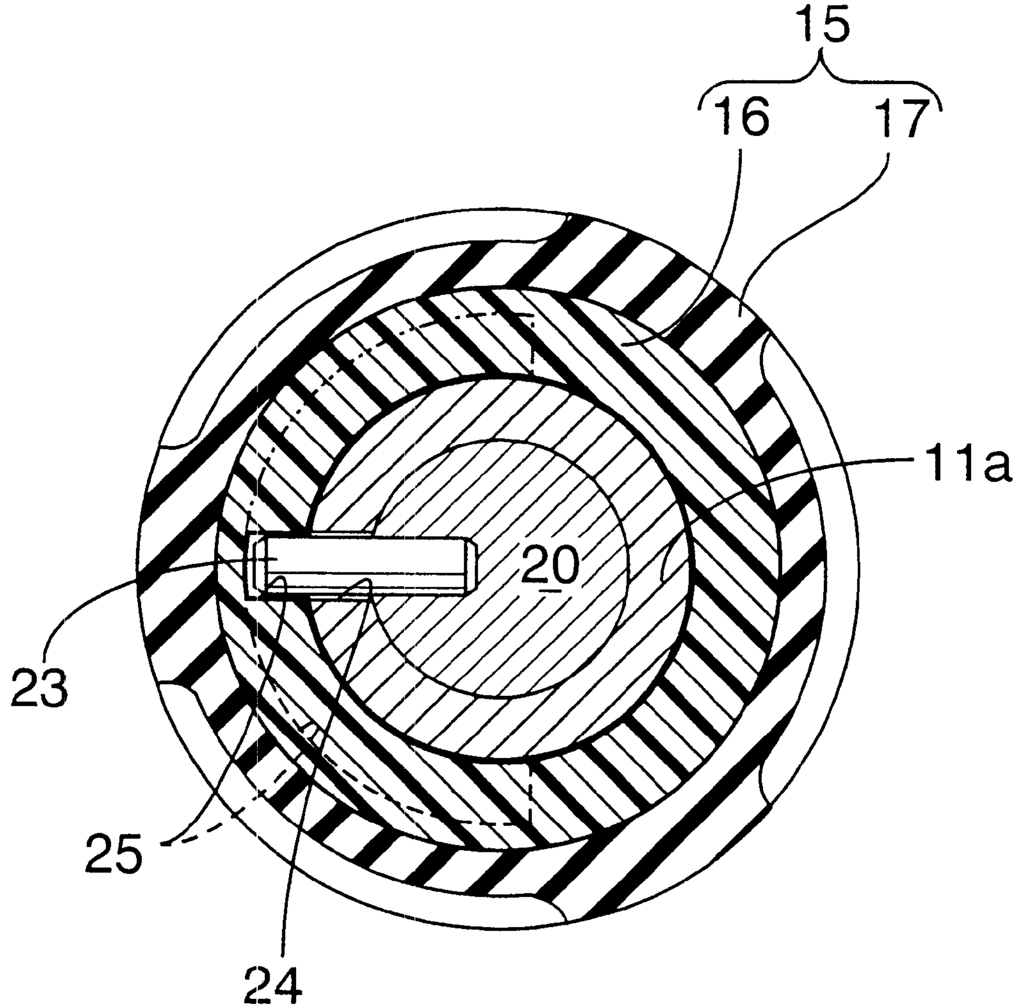
FIG. 4 is a sectional view taken along a line 4—4 in FIG. 2.

As shown in FIGS. 2 to 4, the throttle grip 15 is comprised of a bottomed cylindrical grip body 16 made of a synthetic resin and rotatably fitted over a hollow support shaft 11*a* formed at an end portion of the bar handle 11, and a grip rubber member 17 mounted to cover an outer peripheral surface of the grip body 16. A short shaft portion 18 is projectingly provided on an end face of the support shaft 11*a* and relatively rotatably passed through an end wall of the grip body 16, and the grip body 16 is prevented from being slipped out, by a bolt 19 threadedly engaged in the short shaft portion 18.

A slider 20 is slidably received in a cavity in the support shaft 11*a*, and an operating wire 21 leading to the throttle valve (not shown) provided in an intake system in the engine E is. connected to the slider 20 through a regulating rod 22.

The slider 20 includes an operating pin 23 protruding from one side of the slider 20. On the other hand, an axially extending elongated bore 24 is provided in one sidewall of the support shaft portion 11*a*, and a helical groove 25 is defined in an inner wall of the grip body 16. The operating pin 23 is slidably passed through the elongated bore 24 and slidably engaged in the helical groove 25.

Thus, when a user grasps the throttle grip 15 to turn it to his side or to the other side, the helical groove 25 in the grip body 16 permits the operating pin 23 to be reciprocally slid along the elongated bore 24 in the support shaft 11*a*, and the slider 20 reciprocally slid within the support shaft 11*a* along with the operating pin 23 pushes or pulls the operating wire 21 to open or close the throttle valve (not shown).

Figure 5:
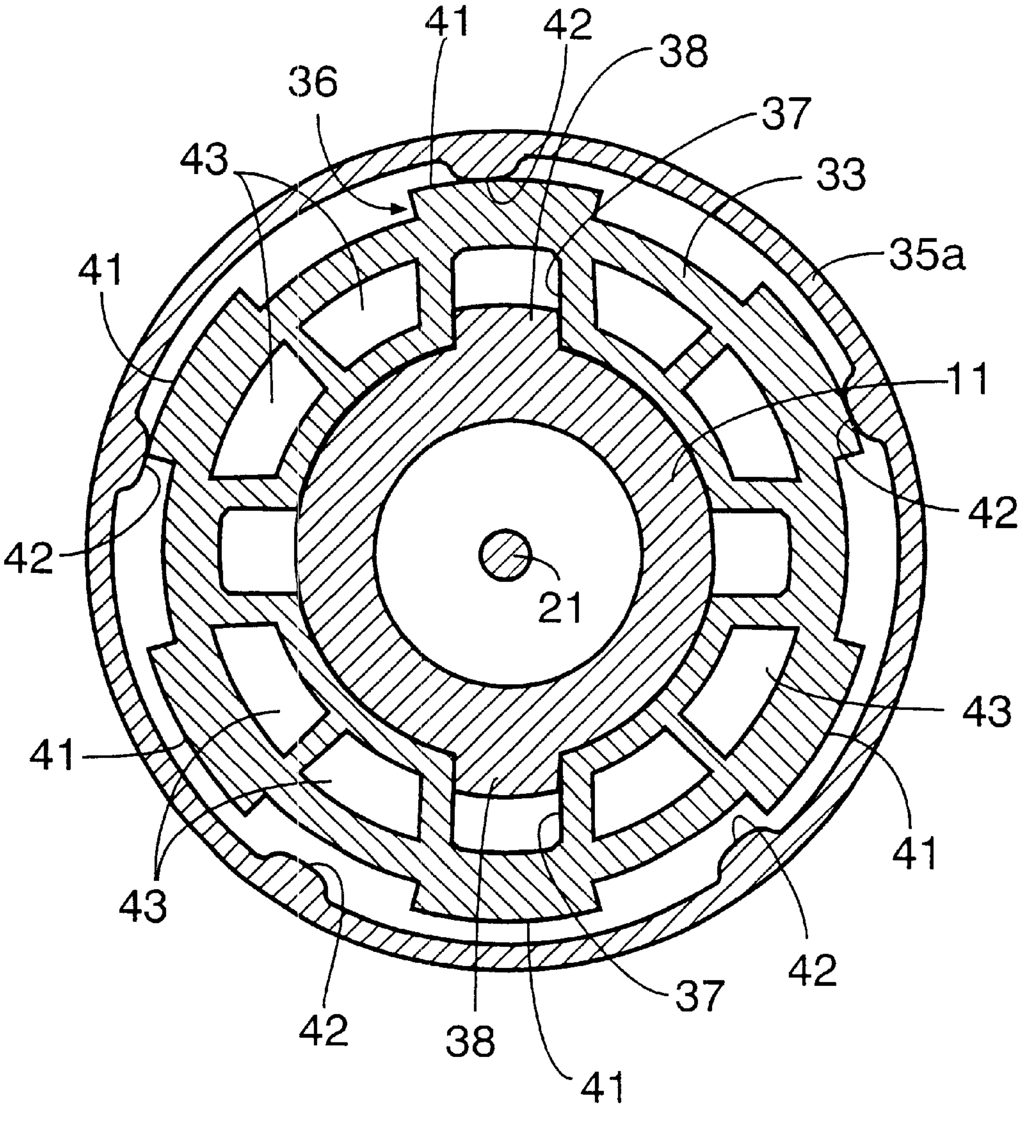
FIG. 5 is a sectional view taken along a line 5—5 in FIG. 3.
Figure 6:
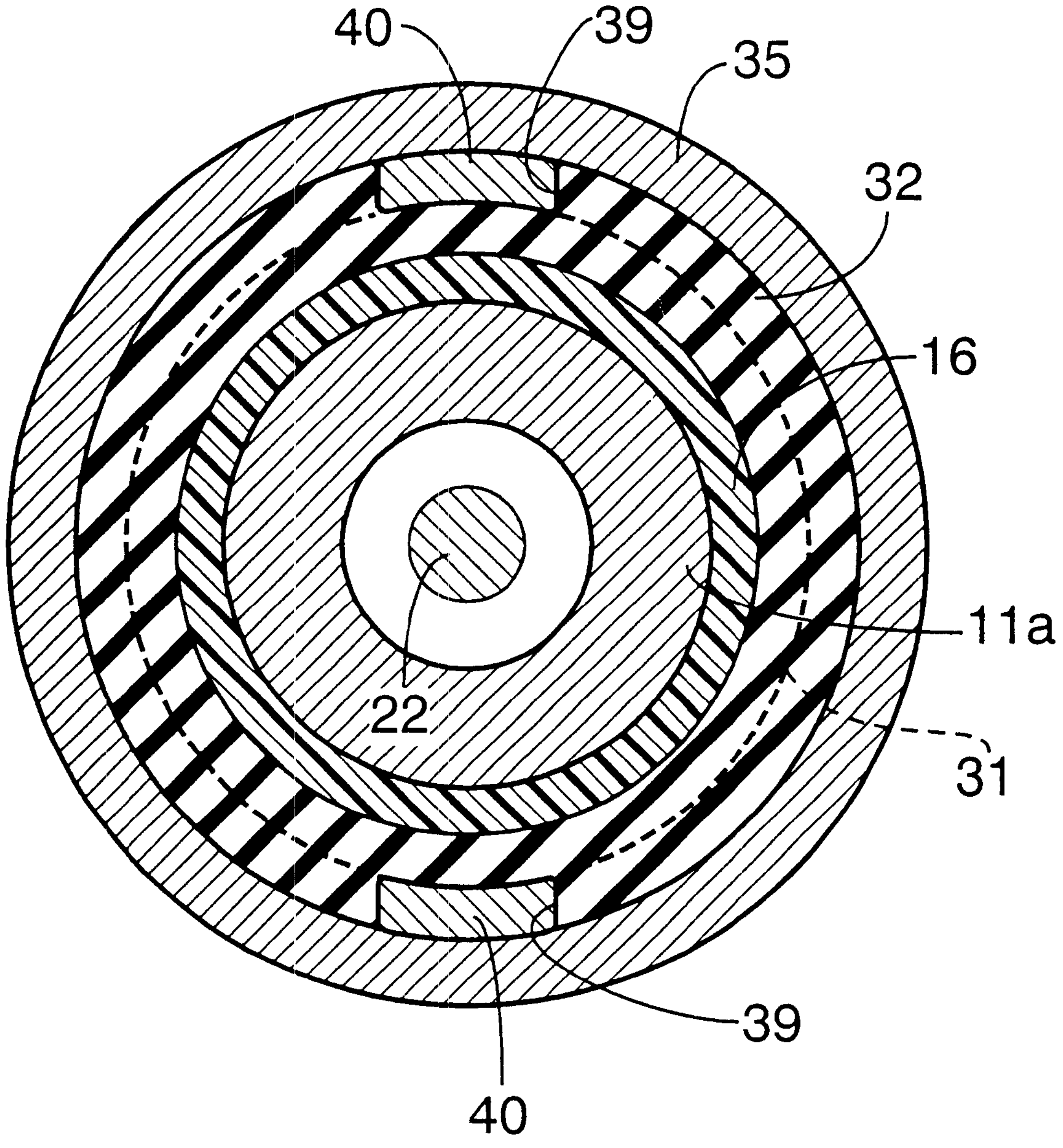
FIG. 6 is a sectional view taken along a line 6—6 in FIG. 3.

A throttle grip position maintaining device 30 for maintaining the throttle grip 15 operated in the above manner at a position corresponding to any throttle opening-degree is mounted between the bar handle 11 and the throttle grip 15. The device 30 will be described below with reference to FIGS. 3, 5 and 6.

The throttle grip position maintaining device 30 comprises an outward-facing flange 31 (a portion to be held) integrally formed at an inner end of the grip body 16, an annular friction member 32 fitted over the grip body 16 and superposed on an axially outer end face of the outward-facing flange 31, a cylindrical support member 33 axially slidably mounted on the bar handle 11, a cylindrical regulating member 35 threadedly fitted over the support member 33 and having an inward-facing flange 34 (an urging portion) abutting against an axially outer end face of the friction member 32, and a click stop mechanism 36 (an anti-loosening means) provided between the support member 33 and the regulating member 35 and inhibiting the movement of the regulating member 35, unless a rotational torque equal to or larger then a predetermined value is applied to the regulating member 35. Each of the support member 33 and the regulating member 35 is made of a synthetic resin.

A single line or a plurality of lines (two lines perpendicular to a diameter line of the support member 33 in the illustrated embodiment) of axial grooves 37 are formed on an inner peripheral surface of the support member 33. A single line or a plurality of lines of projections 38 projectingly provided on an outer peripheral surface of the support shaft portion 11*a* are slidably fit in the axial grooves 37, thereby prohibiting the rotation of the support member 33 about the support shaft portion 11*a*.

The friction member 32 is made of an elastomer such as a rubber, and a single line or a plurality of lines (two lines in the illustrated embodiment) of axial grooves 39 are made on an outer peripheral surface of the friction member 32. Fitting projections 40 projectingly provided on an outer end face of the support member 33 are slidably fit in the axial grooves 39, thereby inhibiting the rotation of the friction member, but the friction member 32 and the outward-facing flange 31 of the grip body 16 are rotatable relative to each other. The axial length of the projection 40 is set such that the projection 40 does not obstruct the compressive deformation of the friction member 32 caused by the outward-facing flange 31 of the grip body 16 and the inward-facing flange 34 of the regulating member 35.

The click stop mechanism 36 is comprised of a plurality of first protrusions 41 formed integrally and projectingly on an outer peripheral surface of the support member 33 and arranged at circumferentially equal distances, and a plurality of second protrusions 42 formed integrally and projectingly on an inner peripheral surface of a thinned portion 35*a* of the regulating member 35 surrounding the plurality of protrusions 41 and arranged at circumferentially equal distances. The first and second protrusions 41 and 42 are designed to be brought into and out of engagement with each other by the elastic deformation of the thinned portion 35*a* of the regulating member 35, whenever the regulating member 35 is rotated through a given angle.

The number of the first protrusions 41 is slightly smaller than that of the second protrusions 42, and in the illustrated embodiment, the number of the first protrusions 41 is six, and the number of the second protrusions 42 is five. Moreover, the circumferential width of the first protrusions 41 is set larger than that of the second protrusions 42.

In Figures, reference numeral 43 refers to cut-out portions of the support member 33.

The operation of the embodiment will be described below.

When a user grasps and turns the regulating member 35 so that the regulating member 35 is tightened relative to the support member 33, both the support member 33 and the regulating member 35 are displaced axially. As a result, the outer end face of the support member 33 and the inward-facing flange 34 of the regulating member 35 axially clamp the friction member 32 and the outward-facing flange 31 cooperatively, thereby providing a compressive deformation to the friction member 32 without applying a thrust load to the throttle grip 15. Thus, in the illustrated embodiment, the friction force between the outward-facing flange 31 of the grip body 16 and the friction member 32 which are capable of being rotated relative to each other is increased. This friction force acts as a resistance to the rotation of the throttle grip 15 to retain the throttle grip 15 at a position corresponding to any opening degree of the throttle valve. The force for retaining the throttle grip 15 is dependent on an amount of tightening of the regulating member 35 relative to the support member 33, i.e., an amount of compressing of the friction member 32. Namely, if the amount of tightening of the regulating member 35 relative to the support member 33 is small, the force for retaining the throttle grip 15 is small. On the other hand, if the amount of tightening of the regulating member 35 relative to the support member 33 is large, the force for retaining the throttle grip 15 is large. In this regulation of the retaining force, if the support member 33 is slightly axially slid, it is avoided that the thrust load is applied to the throttle grip 15, resulting in no variation in opening degree of the throttle valve.

On the other hand, in the click stop mechanism 36, some of the first protrusions 41 and some of the second protrusions 42 are always in engagement with each other, while providing the elastic deformation to the thinned portion 35*a* of the regulating member 35, thereby inhibiting the disorderly movement of the regulating member 35. Therefore, the regulated retaining force on the throttle grip 15 can be maintained stably, to provide an enhancement in steerability of the outboard engine system. Whenever the regulating member 35 is rotated through a given angle, some of the first protrusions 41 are disengaged from the second protrusions 42 with which they have been engaged hitherto, and at the same time, the other first and second protrusions 41 and 42 are newly engaged with each other, thereby providing a sense of moderation to the user. Therefore, the user can sense an angle of rotation of the regulating member 35, i.e., a degree of compression of the friction member 32.

Moreover, the click stop mechanism 36 comprising the first and second protrusions 41 and 42 is extremely simple in configuration, and can be produced at a low cost.

In addition, it is possible to easily set a given angle of the rotation of the regulating member 35 in order to provide the sense of moderation to the user by providing the first and second protrusions 41 and 42 in different numbers and with different circumferential widths.

The number of the second protrusions 42 may be larger than that of the first protrusions 41, and the circumferential width of the second protrusions 42 may be set larger than that of the first protrusions 41. In addition, when the first and second protrusions 41 and 42 are brought into and out of engagement with each other, an elastic deformation may be generated in the support member 33.

Although the embodiment of the present invention has been described in detail, it will be understood that the present invention is not limited to the above-described embodiment, and various modifications in design may be made without departing from the spirit and scope of the invention defined in claims.

What is claimed is:

1. A throttle grip position maintaining device in an outboard engine system, which is mounted between a bar handle for steering the outboard engine system and a throttle grip rotatably but axially non-movably fitted over said bar handle for controlling the opening degree of a throttle valve of an engine, thereby providing a frictional resistance to said throttle grip to retain said throttle grip at a position corresponding to any opening degree of the throttle valve, said throttle grip position maintaining device comprising a retained portion which is integrally formed on said throttle grip, a friction member axially superposed on said retained portion, a support member disposed on axially one side of said retained portion and said friction member and axially slidably but non-rotatably mounted to said bar handle, a regulating member threadedly fitted over said support member and having an urging portion disposed on the axially other side of said retained portion and said friction member, and an anti-loosening means provided between said support member and said regulating member for inhibiting the disorderly movement of said regulating member, said friction member being non-rotatably connected relative to one of said retained portion and said support member, but being rotatably connected relative to the other of said retained portion and said support member.

2. A throttle grip position maintaining device in an outboard engine system according to claim 1, wherein said anti-loosening means comprises a click stop mechanism designed to provide a sense of moderation to a user, whenever said regulating member is rotated through a given angle.

3. A throttle grip position maintaining device in an outboard engine system according to claim 2, wherein said click stop mechanism comprises a plurality of first protrusions projectingly provided on an outer peripheral surface of said support member and arranged at circumferentially equal distances, and a plurality of second protrusions projectingly provided on an inner peripheral surface of said regulating member surrounding the plurality of the first protrusions and arranged at circumferentially equal distances so that some of said second protrusions are elastically brought into or out of engagement with some of the first protrusions, whenever said regulating member is rotated through a given angle.

4. A throttle grip position maintaining device in an outboard engine system according to claim 3, wherein the numbers of said first and second protrusions are different from each other, and the circumferential widths of said first and second protrusions are also different from each other, whereby some of said first protrusions and some of said second protrusions are in elastic engagement with each other in any rotated position of said regulating member.

* * * * *